(12) United States Patent
Twigg et al.

(10) Patent No.: US 6,857,265 B2
(45) Date of Patent: Feb. 22, 2005

(54) DIESEL EXHAUST SYSTEM INCLUDING NOX-TRAP

(75) Inventors: Martyn Vincent Twigg, Cambridge (GB); Anthony John Joseph Wilkins, Essex (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/297,525

(22) PCT Filed: Jun. 4, 2001

(86) PCT No.: PCT/GB01/02430

§ 371 (c)(1),
(2), (4) Date: May 19, 2003

(87) PCT Pub. No.: WO01/94759

PCT Pub. Date: Dec. 13, 2001

(65) Prior Publication Data

US 2003/0177763 A1 Sep. 25, 2003

(30) Foreign Application Priority Data

Jun. 6, 2000 (GB) .............................................. 0013607

(51) Int. Cl.⁷ ................................................. F01N 3/00
(52) U.S. Cl. .............................. 60/295; 60/274; 60/285; 60/297; 60/301; 422/169; 422/172
(58) Field of Search .......................... 60/274, 285, 286, 60/295, 297, 301, 303, 311; 422/169, 172, 182, 183; 423/235, 418.2

(56) References Cited

U.S. PATENT DOCUMENTS

| | | | |
|---|---|---|---|
| 4,793,135 A | | 12/1988 | Obstfelder et al. |
| 4,873,066 A | * | 10/1989 | Epperly et al. .............. 423/235 |
| 4,902,487 A | | 2/1990 | Cooper et al. |
| 4,999,177 A | * | 3/1991 | Chen et al. .............. 423/418.2 |
| 5,471,836 A | | 12/1995 | Takeshima et al. |
| 5,746,989 A | * | 5/1998 | Murachi et al. .............. 60/274 |
| 5,924,280 A | * | 7/1999 | Tarabulski .................... 60/286 |
| 6,105,365 A | * | 8/2000 | Deeba et al. .................. 60/303 |
| 6,141,960 A | * | 11/2000 | Takami et al. ................. 60/286 |
| 6,233,927 B1 | * | 5/2001 | Hirota et al. ................. 60/295 |
| 6,293,096 B1 | * | 9/2001 | Khair et al. .................. 60/295 |
| 6,434,929 B1 | * | 8/2002 | Nishimura et al. ........... 60/278 |
| 6,775,972 B2 | * | 8/2004 | Twigg et al. ................. 60/275 |
| 2003/0213232 A1 | * | 11/2003 | Brisley et al. ................ 60/285 |

FOREIGN PATENT DOCUMENTS

| | | |
|---|---|---|
| DE | 198 12 829 | 10/1998 |
| DE | 199 41 439 | 3/2000 |
| EP | 0 341 832 | 11/1989 |
| EP | 0 758 713 | 2/1997 |
| EP | 0 814 248 | 12/1997 |
| GB | 1 466 947 | 3/1977 |
| GB | 2 303 565 | 2/1997 |
| JP | 52-36609 | * 3/1977 |
| JP | 6-108827 | * 4/1994 |
| WO | WO 99/39809 | 8/1999 |
| WO | WO 00/21647 | 4/2000 |

OTHER PUBLICATIONS

International Search Report dated Oct. 25, 2001, from corresponding International Patent Application No. PCT/GB01/02430.

British Search Report dated Nov. 30, 2000, from British priority Application No. 0013607.7

* cited by examiner

*Primary Examiner*—Tu M. Nguyen
(74) *Attorney, Agent, or Firm*—Ratner & Prestia

(57) ABSTRACT

An exhaust gas treatment system (8) for a diesel engine (10) having a NOx absorber (28) charged with solid absorbent for absorbing NOx from a diesel exhaust gas and means (18) for introducing intermittently into the exhaust system CO upstream of said absorber (28) whereby the solid absorbent is regenerable by contact with the CO-enriched gas. A process for treating NOx in a diesel exhaust gas comprises absorbing the NOx in a solid absorbent and regenerating the absorbent by contacting it with CO-enriched gas.

20 Claims, 1 Drawing Sheet

DIESEL EXHAUST SYSTEM INCLUDING NOX-TRAP

CROSS REFERENCE TO RELATED APPLICATIONS

This application is the U.S. national phase application of PCT International Application No. PCT/GB01/02430.

FIELD OF INVENTION

The present invention relates to an exhaust gas treatment system for a diesel engine, and in particular to an exhaust system including a NOx-trap. Furthermore, the invention concerns a process for regenerating, i.e. removing absorbed NOx from, a NOx-trap in a diesel exhaust system.

STATEMENT REGARDING FEDERALLY SPONSORED RESEARCH AND/OR DEVELOPMENT

Not applicable.

REFERENCE TO A "SEQUENCE LISTING," A TABLE, OR A COMPUTER PROGRAM LISTING APPENDIX SUBMITTED ON COMPACT DISC (See 37 C.F.R. §1.52(e)(5))

Not applicable.

BACKGROUND OF THE INVENTION

Engine-out emission of carbon monoxide (CO), hydrocarbons (HC) and nitrogen oxides (NOx) depends on the air-to-fuel ratio (A/F), defined by equation (1):

$A/F$=mass of air consumed by the engine/mass of fuel consumed by the engine (1).

The A/F where there is just enough air to complete the combustion of all hydrocarbons in the fuel is known as stoichiometry, and is at 14.7 in gasoline engines. If the A/F is below this value, then the engine operates under excess fuel conditions, leading to incomplete fuel combustion. The exhaust gas will then contain more reducing reactants (CO, HC) than oxidising reactants ($O_2$, NOx), and is called rich. If the A/F exceeds 14.7, then the engine operates under excess air conditions, giving rise to an exhaust gas that contains more oxidising reactants than reducing reactants, and the exhaust gas is called lean.

A common way of classifying the engine-out exhaust gas composition is the lambda ($\lambda$) value, defined by equation (2):

$\lambda$=actual engine $A/F$/stoichiometric engine $A/F$ (2)

From equation (2) it will be seen that when the exhaust gas composition is lean, $\lambda \geq 1$, and when the exhaust gas composition is rich, $1 \geq \lambda$.

In order to control NOx in exhaust gases from lean-burn gasoline engines, there has been devised a NOx absorber/catalyst which stores NOx, e.g. as nitrate, when an engine is running lean. In a stoichiometric or rich environment, the nitrate is understood to be thermodynamically unstable, and the stored NOx is released and is reduced by the reducing species present in the exhaust gas. This NOx absorber/catalyst is commonly called a NOx-trap. By periodically controlling the engine to run stoichiometrically or rich, stored NOx is reduced and the NOx-trap is regenerated.

A typical NOx-trap formulation includes a catalytic oxidation component, such as platinum, a NOx-storage component, such as barium, and a reduction catalyst e.g. rhodium. One mechanism commonly given for NOx-storage during lean engine operation for this formulation is: (i) $NO+½O_2 \rightarrow NO_2$; and (ii) $BaO+2NO_2+½O_2 \rightarrow Ba(NO_3)_2$. In the first step, the nitric oxide reacts with oxygen on active oxidation sites on the platinum to form $NO_2$ by the storage material in the form of an inorganic nitrate.

When the engine runs under rich conditions or at elevated temperatures, the nitrate species become thermodynamically unstable and decompose, producing NO or $NO_2$ according to equation (iii) below. Under rich conditions, these nitrogen oxides are subsequently reduced by carbon monoxide, hydrogen and hydrocarbons to $N_2$, which can take place over the reduction catalyst. (iii) $Ba(NO_3)_2 \rightarrow BaO+2NO+^{3}/_{2}O_2$ or $Ba(NO_3)_2 \rightarrow BaO+2NO_2+½O_2$; and (iv) $NO+CO \rightarrow ½N_2+CO_2$ (and other reactions). In the reactions of (i)–(iv) above the reactive barium species is given as the oxide. However, it is understood that in the presence of air most of the barium is in the form of the carbonate or possibly the hydroxide. The above reaction schemes can be adapted accordingly for species of barium other than the oxide.

Using sophisticated engine management techniques and known fuel injection components such as common rail, it is now becoming possible to adopt NOx-trap technology into the exhaust treatment systems for diesel engines. See, for example, EP-A-0758713 described below.

DESCRIPTION OF THE RELATED ART INCLUDING INFORMATION DISCLOSED UNDER 37 C.F.R. §§ 1.97 AND 1.99.

EP-A-0341832 (see also U.S. Pat. No. 4,902,487) describes a process for removing soot from diesel exhaust gas containing NOx by passing the gas unfiltered over an oxidation catalyst to convert NO to $NO_2$, collecting the soot on a filter and using the $NO_2$-enriched gas to combust the collected soot, the amount of NO converted to $NO_2$ being sufficient to enable the combustion to proceed at a temperature less than 400° C.

The process described in EP-A-0758713 adopts the process disclosed in EP-A-0341832 and further includes the step of removing NOx from the combustion outlet gas by means of a solid absorbent and regenerating the absorbent by intermittent contacting it with rich exhaust gas composition.

It has been proposed to remove NOx from diesel exhaust gas by reacting it catalytically with injected ammonia. This process is generally called selective catalytic reduction (SCR) using ammonia. See, for example, WO-A-99/39809. Ammonia SCR does not necessarily require the exhaust gas composition to be made rich or equivalent, but it does require the addition of a reductant to the exhaust gas.

BRIEF SUMMARY OF THE INVENTION

We have now found that CO is effective to regenerate a NOx absorbent in a diesel exhaust system. More particularly, we have found that the conditions for CO-promoted regeneration are approximately the same as in ammonia SCR and a net-lean diesel exhaust gas composition is preferred.

According to one aspect, the invention provides a process for treating NOx in a diesel exhaust gas comprising absorbing the NOx in a solid absorbent and regenerating the absorbent by contacting it with CO-enriched gas.

According to a preferred embodiment, the CO-enriched gas is produced by intermittently increasing the CO content of the exhaust gas, e.g. by injection into a conduit carrying it.

The gas contacting the absorber typically contains 1–20% v/v of CO. This usually suffices to provide a 20–100-fold excess over the total number of oxygen atoms present in the NOx leaving the absorber during regeneration. Suitably the lambda value of the CO-enriched gas (also referred to herein as the "redox composition" of the gas) is in the range 0.7 to 1.5 lambda, especially 1.0 to 1.2 lambda. It preferably contains at least enough, especially 1.5 to 3 times, the concentration of $O_2$ to oxidise all the CO and other combustibles present. Intermittent increase of CO content need not attain net-rich gas composition.

According to a further aspect, the invention provides an exhaust gas treatment system for a diesel engine comprising a NOx absorber charged with solid absorbent for absorbing NOx from a diesel exhaust gas and means for introducing CO intermittently into the exhaust system upstream of the absorber whereby the solid absorbent is regenerable by contact with the CO-enriched gas.

According to a preferred embodiment, the exhaust system further comprises, upstream of the NOx absorber, a catalyst effective to promote oxidation of at least NO to $NO_2$ and a filter effective to collect diesel soot from the exhaust gas and hold it for combustion reaction with the $NO_2$ in the gas. In this embodiment, the present invention complements our Continuously Regenerating Trap (CRT™) technology which is described in our EP-A-0341832.

Preferably, the NOx absorbent comprises one or more of: (a) compounds of alkali metals, alkaline earth metals, rare earth metals and transition metals capable of forming nitrates and/or nitrites of adequate stability in absorbing conditions and of evolving nitrogen oxides and/or nitrogen in regenerating conditions; or (b) adsorptive materials such as zeolites, carbons and high surface-area oxides, or mixtures of any two or more thereof.

Such a system preferably comprises a catalysed absorbent. By 'catalysed' is meant that the absorbent is intimately associated with catalytic material effective for the reaction of CO with NOx. Such material may be for example co-precipitated or co-impregnated or co-deposited with NOx absorbent or present as one or more sandwiched layers or serial zones or as fine (e.g. 10–500 microns) particles on or in a layer of absorbent or among particles of absorbent. Whether catalysed or not, the absorbent may be provided in one unit or a succession of separate units. It is typically on a honeycomb substrate, such as a single honeycomb or multiple honeycombs.

Compounds (a) may be present (before NOx absorption) as composite oxides, e.g. of alkaline earth metal and copper such as Ba—Cu—O or $MnO_2$—$BaCuO_2$, possibly with added Ce oxide, or Y—Ba—Cu—O and Y—Sr—Co—O. (For simplicity the oxides are referred to, but in situ hydroxides, carbonates and nitrates are present, depending on the temperature and gas composition). Whichever compounds are used, there may be present also one or more catalytic agents, such as precious metals, especially PGMs, effective to promote redox reactions between nitrogen oxides and CO.

The oxidation catalyst or the catalyst associated with the absorbent or following it can be any that is active and stable. Typically these catalysts comprise one or more PGMs, especially Pt, Rh, Pd and combinations thereof, on a high-surface area washcoat on a honeycomb structure. Detailed catalyst formulation is chosen according to which duty in the system the catalyst is to carry out. Suitable catalysts have been described in the prior art and are available to skilled persons.

The catalysts and absorbent are suitably carried on a ceramic or metal honeycomb substrate, the ceramic comprising one or more of alumina, silica, titania, cordierite, ceria, zirconia, silicon carbide or other, generally oxidic, material. The honeycomb carries a washcoat and, in one or more layers thereon, the active catalytic and/or absorptive material. The honeycomb has typically at least 50 cells per square inch (cpsi), possibly more, e.g. up to 1000 cpsi, or up to 1200 cpsi if composed structurally of metal. Generally the range 100–900 cpsi is preferred for the catalysts and absorbent.

Desirably, the filter is capable of trapping the soot without causing excessive backpressure in the system and engine upstream. In general, ceramic, sintered metal or woven or non-woven wire filters are usable, and wall-flow honeycomb structures may be particularly suitable. The structural material of the filter is preferably porous ceramic oxide, silicon carbide or sintered metal. A coating such as alumina and/or a catalyst such as $La/Cs/V_2O_5$ may be present. The soot is generally carbon and/or heavy hydrocarbons, and is converted to carbon oxides and $H_2O$. Certain embodiments of this principle are in commercial use in Johnson Matthey's Continuously Regenerating Trap (CRT™) technology, and are described in above-mentioned EP-A-0341832 (see also U.S. Pat. No. 4,902,487), the teaching of which is incorporated herein by reference.

According to a preferred embodiment, the system may further comprise, downstream of the absorber, a catalyst system effective to promote reactions of HC and CO with $O_2$ to $H_2O$ and $CO_2$ and preferably with NOx to $N_2$.

Advantageously, the system may further comprise sensors, indicators, computers and actuators, effective to maintain operation within desired conditions. Preferably a means for controlling CO enrichment of the exhaust gas includes a computer which can be part of the engine management unit if desired. Control of the system can be regulated with open or closed feedback using information gathered from the sensors, indicators, etc. as explained below.

For regeneration of the NOx absorber the CO may be fed in as such, subject to effective precautions against leakage, or as one or more compounds decomposable to CO in the conditions of the system, for example formic acid. Compounds introducing reductant, for example formic esters such as methyl formate, may be used. If reductant such as diesel fuel or HC derived therefrom is present, its concentration by carbon atoms is less than the CO, especially less than 10% of the CO. The CO is introduced preferably by engine inlet adjustment.

Preferably the means for controlling the regeneration of the absorber performs one or more of the following illustrative techniques:

(a) injection responsive to ultimate detection of NOx leakage from or "slip" past the NOx absorber;
(b) injection responsive to prediction based on input of data on deliberate or load responsive engine management variation; and
(c) allowance for gas composition variations, for example non-steady conditions such as incomplete warm-up or weather. Usually the regeneration phase can be a small fraction of engine running time, e.g. 0.1% to 5%, depending of course on operating conditions.

The required CO-rich gas is obtained, for example, by pilot injection technique.

The control means may include sensors for at least one of: fuel composition; air/fuel ratio; exhaust gas composition (including tail-pipe $NO_2$) and temperature at one or more points along the exhaust system; and pressure drop, especially over the filter. It may include also indicator means informing the engine operator, computer means effective to evaluate the data from the sensor(s), and control linkages effective to adjust the engine to desired operating conditions taking account of e.g. start-up, varying load and chance fluctuations.

In addition, the system may include routine expedients, for example exhaust gas recirculation (E.G.R); and means such as cooling, or electric heating, to adjust the temperature of the gas to a level preferred for nearer optimum operation of downstream components.

According to a further aspect, there is provided a diesel engine having an exhaust system according to the invention. The engine is preferably of the direct injection common-rail type, especially using injection pressures in the range 1000–2000 bar, and advantageously is turbo-charged.

The engine may be the motive power for a vehicle, or may be a stationary power source or auxiliary power source. It may be for a 'heavy duty' vehicle, e.g. at least 3500 Kg (as defined by the relevant European, US Federal or Californian legislation), or a 'light duty' vehicle, including in particular a passenger car or light van and likely to be operated according to the 'urban cycle'.

Desirably the engine is fuelled with low-sulphur fuel, i.e. having less than 50 ppm, especially less than 10 ppm, by weight as elemental S. For operation with higher sulphur fuels, a SOx absorbent may be used.

Most preferably, the engine according to the invention is operated in compliance with the European IV standard.

The system may be structured within a single housing ("can"), or in separated housings according to engine design and under-floor or other space considerations. Thus for example for V-engine configurations, some or all of the elements of the system may be disposed in parallel.

In order that the invention may be more fully understood, reference is made, by way of illustration only, to the Example below and the accompanying drawing, which shows schematically a diesel engine equipped with a preferred embodiment of an exhaust system according to the invention. In the drawing, full lines represent flow of gas and dotted lines represent flow of information or control power.

DETAILED DESCRIPTION OF THE INVENTION

Figure 1:
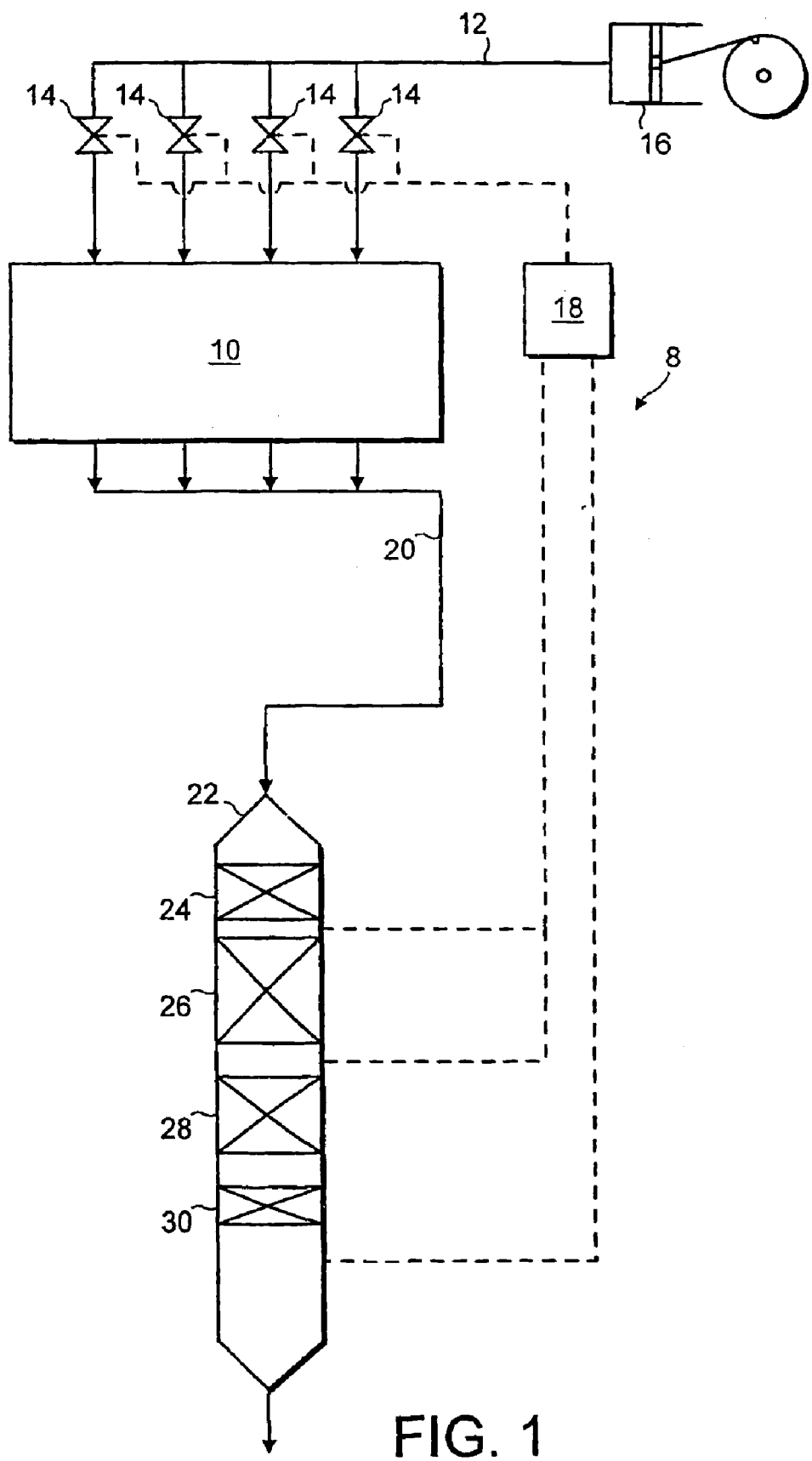
FIG. 1 is a schematic view of a diesel engine and an exhaust system according to the present invention.

FIG. 1 illustrates an exhaust system 8 for a diesel engine 10, which engine having a common rail fuel feed 12 including valves 14 and high pressure pump 16 supplying diesel fuel, for example of under 50 ppm sulphur content. Exhaust system 8 comprises fuel feed 12 under the control of computer 18 which computer is responsive inter alia to gas composition at the outlet of catalyst 30 (described below) and to pressure-drop across filter 26 (also described below), and is programmed to actuate valves 14 to inject fuel at the normal inlet stroke, and also to vary inlet conditions to produce CO-enriched exhaust intermittently. Engine exhaust gas passes via pipe 20 to can 22, at the inlet end of which is catalyst 24, a low temperature light-off oxidation catalyst supported on a 400 cells/in$^2$ ceramic honeycomb. Catalyst 24 is designed to convert at least 70% of the NO in the normal gas to $NO_2$.

The gas leaving catalyst 24 passes into soot filter 26, which is of the ceramic wall flow type, and collects soot particles over 50 nm. The $NO_2$ and surplus oxygen in the gas oxidise the soot at temperatures around 250° C. with no tendency to blocking.

Gas leaving filter 26 then enters NOx absorber 28 which includes also PGM catalytic material. During normal lean operation of the engine and without CO enrichment by 18, absorber 28 absorbs NOx from the exhaust gas while it has capacity so to do. When, however, gas enriched with CO reaches it, the NOx is released and converted at least partly to $N_2$, for example by action of a reducing catalyst, such as rhodium. The gas, now still containing CO, $O_2$ and possibly some NOx, passes into catalyst 30, where these reactants are brought substantially to chemical equilibrium comprising less environmentally harmful gases.

The process and system of the invention is expected to be capable of meeting European Stage IV emission legislation.

EXAMPLE

A NOx absorber comprising a 400 cpsi monolith having wall thickness of 6/1000 of an inch, measuring 1 inch in length by 3 inches in diameter and carrying a coating containing 62.8% w/w alumina, 23.8% w/w ceria-zirconia mixed oxide, 9.9% w/w magnesia, 1.7% w/w platinum, 1.67% w/w palladium, 0.167% w/w rhodium, was subjected for 520 seconds at 200° C. to a synthetic gas stream to imitate the exhaust of a diesel engine, but containing NOx at 500 ppm. It was then fully regenerated by switching the gas feed to net-rich for 180 seconds ['rich ramp'] and operated in this cycle at the same temperature and flow rate: 5 seconds regeneration phase in CO-enriched gas; 60 seconds absorption phase in untreated lean gas.

The gas compositions at the absorber inlet and the NOx concentrations at relevant points are shown in Tables 1 and 2 respectively.

TABLE 1

|  | Rich ramp | lean storage | lean regeneration |
|---|---|---|---|
| Lambda | 0.96 | 1.39 | 1.20 |
| $H_2O$ | 10 | 10 | 10 |
| $CO_2$ | 10 | 10 | 10 |
| $O_2$ | 0.5 | 6.2 | 6.2 |
| CO | 2.0 | 0.04 | 5 |
| $H_2$ | 0.67 | 0.01 | 0.01 |
| $C_3H_6$ | 100 ppm | 100 ppm | 100 ppm |
| NOx | 500 ppm | 500 ppm | 500 ppm |

TABLE 2

| NOx ppm at absorber outlet | | |
|---|---|---|
| Rich-regenerated: | start | 1 |
|  | end | 300 |
| Cycle 1: | start | 150 |
|  | end | 320 |
| Cycle 2: | start | 100 |
|  | end | 360 |
| Cycle 3: | start | 100 |
|  | end | 390 |

It is evident that CO is capable of substantial regeneration of the absorber, and has the potential, after optimisation, for comparability with rich regeneration.

What is claimed is:

1. A process for treating NOx in a diesel exhaust gas comprising CO, NOx, soot, HC and $O_2$, which process comprising catalysing oxidation of NO to $NO_2$, collecting the soot on a filter, combusting the soot by reaction with the $NO_2$, absorbing NOx present in the gas in a solid regenerable absorbent and intermittently regenerating the absorbent by increasing the CO content of the exhaust gas and contacting said absorbent therewith, wherein the redox composition of the CO-enriched exhaust gas is in the range of 1.0 to 1.2.

2. A process according to claim 1, wherein the CO content of the exhaust gas is increased by engine inlet adjustment.

3. A process according to claim 1, wherein the CO content of the exhaust gas is increased by introducing CO per se or a CO precursor compound into the exhaust gas.

4. A process according to claim 1, wherein the CO content of the regenerating gas is in excess (by carbon atoms) over all other carbon-containing reductants present.

5. A process according to claim 1, wherein the CO-enriched gas contains CO in a 20–100 fold excess over the total number of oxygen atoms present in the NOx leaving the absorbent during regeneration.

6. A process according to claim 1, wherein the CO-enriched gas contains at least enough $O_2$ to oxidise all the CO and other combustibles present.

7. A process according to claim 1, wherein the gas is the product of combustion of a fuel containing less than 50 ppm w/w of sulphur.

8. A process according to claim 1, wherein the CO content of the exhaust gas is increased by introducing a CO precursor compound into the exhaust gas, wherein the CO precursor compound is formic acid or esters of formic acid.

9. A process according to claim 8, wherein the CO precursor compound is methyl formate.

10. A diesel engine comprising an exhaust gas treatment system comprising a catalyst effective to promote oxidation of at least NO to $NO_2$; a filter disposed downstream of the oxidation catalyst effective to collect diesel soot from the exhaust gas and hold it for combustion of the soot, wherein the combustion of the soot is by reaction with the $NO_2$ in the gas; a NOx absorber charged with solid absorbent for absorbing NOx; and means for introducing CO intermittently into the exhaust system upstream of the NOx absorber to produce a CO-enriched gas of redox composition of from 1.0 to 1.2 lambda, wherein the solid absorbent is regenerable by contact with the CO-enriched gas.

11. An exhaust system according to claim 10, wherein the CO introducing means comprises means for adjusting the engine inlet.

12. An exhaust system according to claim 10, wherein the CO introducing means comprises means for introducing CO per se or a CO precursor compound into the exhaust system.

13. A diesel engine according to claim 10, wherein the solid absorbent comprises at least one of: (a) an alkali metal compound, an alkaline earth metal compound, a rare earth metal compound and a transition metal compound adapted for forming a nitrate, adapted for forming a nitrite or adapted for forming both a nitrate and a nitrite, which nitrate or nitrite having adequate stability in absorbing conditions and being adapted for evolving nitrogen oxides, nitrogen or nitrogen oxides and nitrogen in regenerating conditions; (b) an adsorptive material; and (c) mixtures of (a) and (b).

14. A diesel engine according to claim 10, wherein the NOx absorber is catalysed.

15. A diesel engine according to claim 10, further comprising sensors, indicators, computers and actuators, effective to maintain operation within desired conditions.

16. A diesel engine according to claim 10, which is of the direct injection common-rail type.

17. A diesel engine according to claim 10, further comprising, downstream of the NOx absorber, a catalyst system effective to promote reactions of HC and CO with $O_2$ to $H_2O$ and $CO_2$.

18. A diesel engine according to claim 17, wherein the catalyst system is further effective to promote reaction of HC and CO with NOx to $N_2$.

19. A diesel engine according to claim 10, operated in compliance with the European IV standard.

20. A turbo-charged diesel engine according to claim 19.

* * * * *